United States Patent
Chen et al.

(10) Patent No.: US 11,084,732 B2
(45) Date of Patent: Aug. 10, 2021

(54) METHOD FOR MANUFACTURING HIGH-PERFORMANCE COMPOSITE ACTIVE MATERIAL OF ZINC OXIDE POWDER

(71) Applicant: STAR MATE LIMITED, Changhua County (TW)

(72) Inventors: Zhu-Ting Chen, Taichung (TW); Shu-Wei Lu, Taichung (TW)

(73) Assignee: STAR MATE LIMITED, Changhua County (TW)

( * ) Notice: Subject to any disclaimer, the term of this patent is extended or adjusted under 35 U.S.C. 154(b) by 106 days.

(21) Appl. No.: 16/408,416

(22) Filed: May 9, 2019

(65) Prior Publication Data
US 2020/0354227 A1    Nov. 12, 2020

(51) Int. Cl.
*C01G 9/03*    (2006.01)

(52) U.S. Cl.
CPC ............ *C01G 9/03* (2013.01); *C01P 2004/03* (2013.01); *C01P 2004/64* (2013.01); *C01P 2006/20* (2013.01)

(58) Field of Classification Search
CPC ...................................................... C01G 9/03
See application file for complete search history.

(56) References Cited

U.S. PATENT DOCUMENTS

2012/0199788 A1*  8/2012  Guidi ............... C09C 1/3045
                                                        252/182.33

\* cited by examiner

*Primary Examiner* — James A Fiorito
(74) *Attorney, Agent, or Firm* — Leong C. Lei

(57) ABSTRACT

The present invention is a method for manufacturing a high-performance composite active material of zinc oxide powder, which is a method for manufacturing a high-performance composite active zinc oxide material powder as an aid for an operation of shaping and vulcanization of rubber/plastic materials, generally carried out by mixing an alkali solution and a calcium compound, in combination with addition of a zinc salt to directly carry out a chemical reaction therewith through mixture so as to obtain a precipitation solution of a predetermined pH value, following a process of filtering to remove water to form an intermediate powder material, which is subjected to drying to form zinc oxide long crystal material exhibiting nanometer scale high performance composite activity, helping achieve a purpose of diversification of application of zinc oxide power in industry.

5 Claims, 2 Drawing Sheets

METHOD FOR MANUFACTURING HIGH-PERFORMANCE COMPOSITE ACTIVE MATERIAL OF ZINC OXIDE POWDER

(a) TECHNICAL FIELD OF THE INVENTION

The present invention relates generally to a method for manufacturing a high-performance composite active material of zinc oxide powder, in which a calcium-containing compound is used and zinc oxide powder is formed, through processing of mixing, stirring, and reacting, followed by filtering off water and drying, as growing in the form of nanometer crystal from a zinc oxide solution to attach to a calcium compound, so as to achieve, when used in industry, effect of high performance and efficient and uniform mixture.

(b) DESCRIPTION OF THE PRIOR ART

To shape a rubber/plastic product in a manufacturing process, zinc oxide powder is commonly used as an aid agent to assist an operation of shaping through vulcanization. A common way of fabrication of zinc oxide powder uses a metal zinc ingot as a base material, which is heated to a high temperature of approximately 1,400° C. for melting, followed by multiple operations of processing to form zinc powder that can be used as an additive for shaping and vulcanization of rubber/plastic materials. Such zinc oxide powder has a high cost and the fabrication is complicated and time-consuming due to the operations of high-temperature and grinding. In addition, special machinery is required for such operations, making it highly expensive and highly skill-depending. Consequently, the expenditure of any operations based on such powder is extremely high. The conventional way of grinding can only make particles that are not small enough to improve the amount of consumption and homogeneity of mixture in the use thereof. In order to suit the need for materials to be manufactured finer in size and more efficient in production, particularly under the condition of fabrication that product quality is enhanced, it is desired to improve the existing ways of production of zinc oxide powder in order to overcome the issues of the prior art in regard to production efficiency and making even finer particulates of production of zinc oxide powder.

SUMMARY OF THE INVENTION

In order to overcome the issue that the existing ways of manufacturing zinc oxide powder that is used as an aid agent in shaping and vulcanizing operations do not suit to the need of diversification of application, the present invention provides a method for manufacturing a high-performance composite active material of zinc oxide, which involves chemically mixing and stirring to produce an intermediate material that is subjected to filtering and drying to provide a high-performance composite active material, so as to overcome the impractical issues and deficiencies of the conventional ways of production that provides no zinc oxide powder of stable quality, requires a high level of skill, and is tedious and time-consuming. The primary objective of the present invention is that, as being assisted by chemical reaction, an alkali solution is mixed with a calcium-containing compound to provide a calcium-alkali mixture.

Then, a zinc chloride solution is provided to mix and react with the calcium-alkali solution to provide a precipitation solution of a predetermined pH value, in which the chemical equation of the reaction is $ZnCl_2+2NaOH \rightarrow Zn(OH)_2\downarrow + 2NaCl$. After a filtering operation that removes water, a drying operation is carried out to form high-performance composite active zinc oxide powder of which a posterior stage reaction is $Zn(OH)_2+H_2O \stackrel{\Delta}{=} ZnO$, so as to provide an effect of homogeneous addition in shaping and vulcanizing rubber/plastic materials to effectively enhance tensile strength and elongation rate of the rubber/plastic materials so shaped and also to help keep good vulcanization date to suit the needs for safe addition and use.

Another objective of the present invention is to produce a zinc oxide powder through chemically mixing and stirring so as to achieve formation of nanometer order layer-stacked high-performance molecule powder by means of such mixing, stirring, filtering and drying, for easing addition for processing and uniform and efficient mixing, enhancing product quality and also reducing the amount of added aid agent, the working hours of production, and overall skill level and also achieve the purpose of diversification and economics.

DETAILED DESCRIPTION OF THE PREFERRED EMBODIMENTS

For better understanding of the features and practical purposes of manufacturing of zinc oxide material powder according to the present inventio, a detail description will be provided below with reference to the following embodiments and simplified drawings of fabrication.

Figure 1:
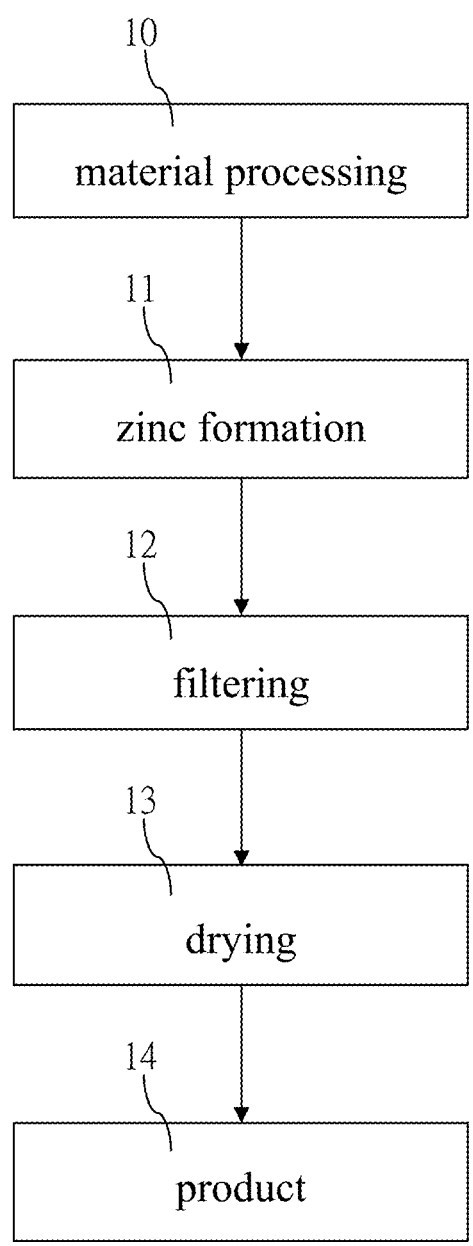
FIG. 1 is a simplified diagram of a flow chart of manufacturing high-performance composite material according to the present invention.
Figure 2:
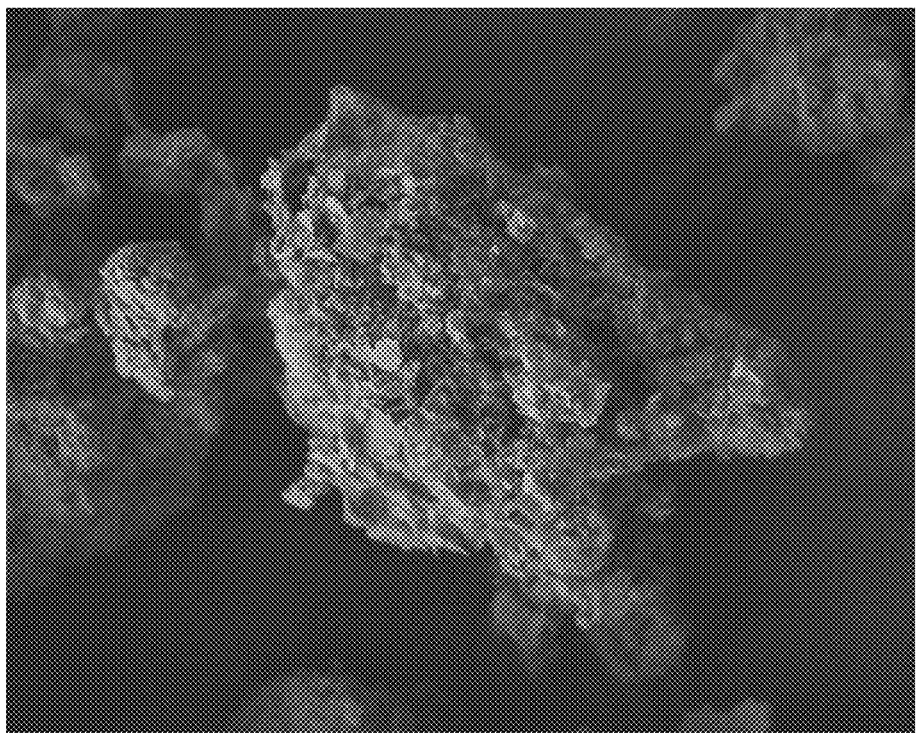
FIG. 2 is a picture showing an outside appearance of zinc oxide attached to and covering calcium carbonate according to the present invention.
Figure 3:
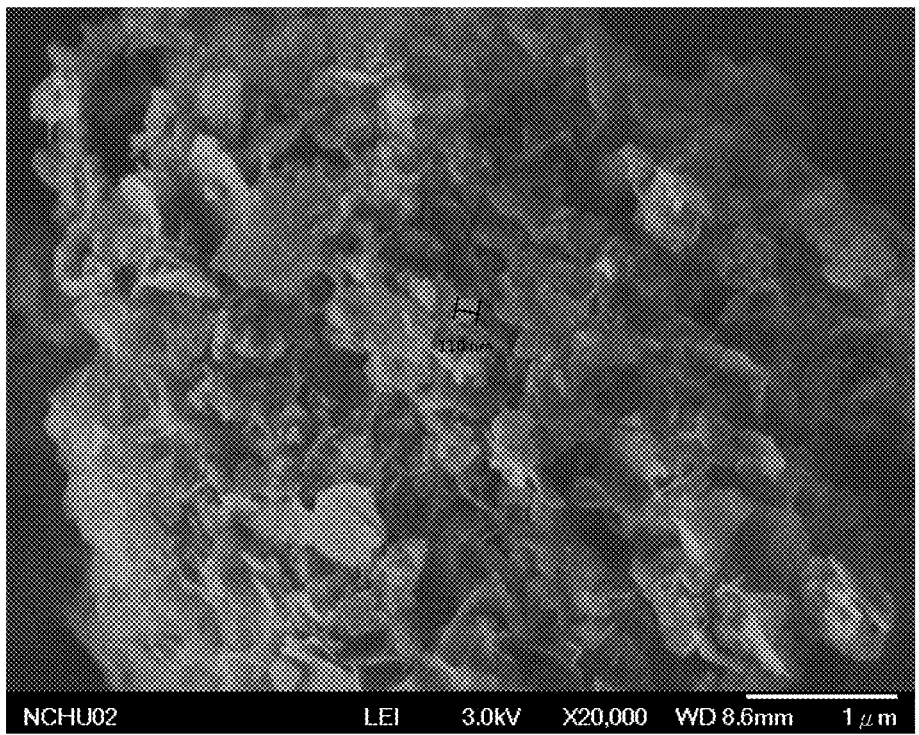
FIG. 3 is a schematic micrometer view showing zinc oxide powder particles according to the present invention.

The present invention provides a method for manufacturing high-performance composite active material of zinc oxide powder, which is used as an additive material in vulcanization and shaping of rubber and plastic materials for the purposes of making vulcanization more uniform and achieving better material properties after the materials are vulcanized and shaped A zinc oxide powder material that can be used for such purposes must be finer and allows for easy and efficient removal. A manufacturing process according to the present invention is illustrated in FIGS. 1-3, in which an example of fabrication by using a calcium-containing compound is provided. The entire process of zinc oxide powder material is generally divided as the following steps. Firstly, a step of raw material processing (10) is carried out, in which a calcium-containing composite is used as a primary raw material and functions as a body to which a material obtained with the present invention may attach. The calcium-containing composite, which is generally calcium carbonate (purity being 98 wt %), is disposed in an alkali solution, which is generally sodium peroxide (NaOH) having a concentration in weight percentage of 20 wt %. Through mixing the calcium-containing compound with the alkali solution, a calcium-alkali mixture liquid or solution is formed. Next, a step of zinc formation (11) is carried out, in which a zinc chloride solution of 99% purity is added with water for being diluted to a concentration of 40 wt %. A material containing zinc salts can be used as a replacement in this regard. A predetermined quantity of the zinc chloride solution is added slowly into the calcium-alkali mixture solution obtained in the step of raw material processing (10), followed by stirring for uniform mixture, which can be carried out by manual stirring or machine-assisted stirring to a condition of being uniformly mixed, so as to obtain a precipitation solution of which a pH value is between 6.8 and 8.0, wherein the two mixture solutions carry out a chemical reaction through mixture thereof, in which the pH value is controlled, in combination with stirring for being uniformly mixed, such that the following reaction occurs: $ZnCl_2+2NaOH \rightarrow Zn(OH)_2 \downarrow +2NaCl$. Then, a step of filtering (12) is performed on the precipitation solution obtained after mixture and reaction by using filter cloth or filter paper such that water contained in the solution is removed, and an intermediate material is obtained, wherein extra fine zinc oxide powder obtained with the operations of mixture and reaction would attach, in a form of lamination, to a surface of a body of calcium compound. Then, a step of drying (13) is applied, in which the filtered and intermediate material is disposed in a drying machine and subjected to drying at a high temperature of 150-250° C. for approximately 2 hours to thereby obtain a product (14) of extremely fine high-performance composite active material of zinc oxide powder. As shown in the pictures of FIGS. 2 and 3, the powder that is formed through the processing of mixing, attaching, filtering, and drying and is attached to a surface naturally forms a stacked pattern and involves particles that are as fine as a size in a nanometer order, thereby providing an efficacy of saving the amount of consumption and enabling efficient and uniform mixture. The entire process of zinc oxide material fabrication and use is safe and practical.

The manufacturing of zinc oxide powder according to the present invention is such that the formation of the powder is naturally achieved through chemical reactions. The entire process is greatly simplified and shortened and no specific machinery is required. The manufacturing can be simplified completed and the technical level is greatly reduced. It only needs to control the pH value to have the zinc oxide solution and the calcium-alkali solution properly mixed to provide a precipitation solution of a desired pH value. Through an easy operation of filtration to remove liquid and direct disposition in a drying machine for drying, fine powder of zinc oxide can be obtained. The entire manufacturing efficiency is greatly increased and the manufacturing time is shorted, making the technical level greatly reduced to make the fabrication easy.

The present invention provides a method for manufacturing a high-performance composite active material of zinc oxide powder, in which a mixture of a calcium compound and an alkali solution is provided and is mixed with a zinc oxide solution to form a precipitation solution of a predetermined pH value, followed by filtration and drying to achieve formation of high-performance composite zinc oxide powder in an attached form, thereby providing an economic and continuous process of manufacturing an aid agent for vulcanization of rubber/plastic materials, exhibiting advantages of economic mass production and providing nanometer powder of high purity.

We claim:

1. A method for manufacturing a high-performance composite active material containing zinc oxide powder, comprising steps of:
    introducing a solution of calcium-containing compound into an alkali solution and mixing to obtain a calcium-alkali mixture solution;
    adding a zinc chloride solution into the calcium-alkali mixture solution and stirring, uniformly mixing, and reacting the zinc chloride solution with the calcium-alkali mixture solution to form a precipitation solution of a pH value between 6.8 and 8.0;
    filtering the precipitation solution and removing water to form an intermediate material; and
    putting the intermediate material into a drying machine and drying at a temperature of 150-250° C. to obtain a high-performance composite active material containing fine zinc oxide powder.

2. The method for manufacturing a high-performance composite active material of zinc oxide powder according to claim 1, wherein the calcium-containing compound is calcium carbonate having a purity of 98 wt %.

3. The method for manufacturing a high-performance composite active material of zinc oxide powder according to claim 1, wherein the alkali solution is a sodium hydroxide (NaOH) solution having a concentration of 20 wt %.

4. The method for manufacturing a high-performance composite active material of zinc oxide powder according to claim 1, wherein the zinc chloride solution has a purity of 99% and is diluted with water to a concentration of 40 wt %.

5. The method for manufacturing a high-performance composite active material of zinc oxide powder according to claim 1, wherein the operation of filtering is carried out with filtering cloth or filtering paper.

* * * * *